Figure 1:
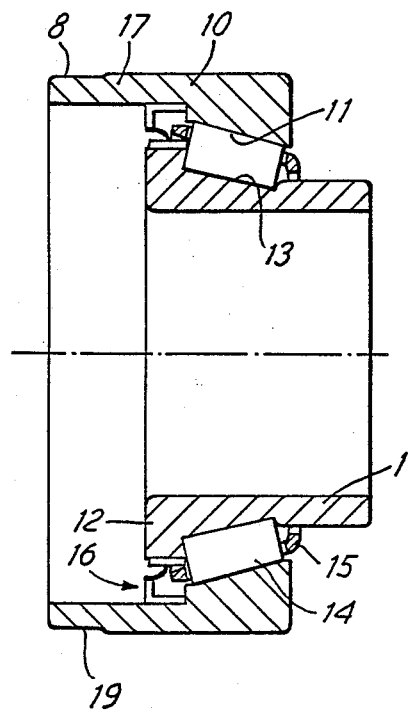

United States Patent [19]

Candiard

[11] Patent Number: 4,900,166
[45] Date of Patent: Feb. 13, 1990

[54] TAPER ROLLER BEARINGS FOR VEHICLE WHEELS
[75] Inventor: Rene Candiard, Ribeauville, France
[73] Assignee: The Timken Company, Canton, Ohio
[21] Appl. No.: 250,374
[22] Filed: Sep. 29, 1988
[30] Foreign Application Priority Data
  Oct. 1, 1987 [GB] United Kingdom ............... 8723032
[51] Int. Cl.4 .............................................. F16C 33/58
[52] U.S. Cl. .................................. 384/560; 384/564; 384/569; 384/571; 384/589
[58] Field of Search ............... 384/571, 569, 564, 544, 384/510, 560, 589, 586

[56] References Cited
U.S. PATENT DOCUMENTS

| | | |
|---|---|---|
| 895,901 | 8/1908 | Shaiduroff ............................ 384/544 |
| 986,454 | 3/1911 | Gillette . |
| 1,259,269 | 3/1918 | Murray . |
| 3,806,214 | 4/1974 | Keiser . |
| 4,696,581 | 9/1987 | Tsushima et al. ................... 384/569 |

Primary Examiner—Lenard A. Footland
Attorney, Agent, or Firm—Gravely, Lieder & Woodruff

[57] ABSTRACT

A taper roller bearing for a non-driven wheel of a vehicle has the annular cup member, which provides its outer raceway, formed with an axial extension over which the rim member of the wheel can be slipped to support and locate the rim while it is being engaged on the wheel studs and while the wheel nuts are placed in position. The extension has its outer end part which is to receive the rim formed slightly smaller external diameter than the main part of the cup. The cone member of the bearing, which provides the inner raceway, may have an axial extension projecting in the opposite direction to the extension of the cup to form a spacer between the bearing and second taper roller bearing disposed coaxially with or in the opposite sense to the first bearing.

13 Claims, 1 Drawing Sheet

TAPER ROLLER BEARINGS FOR VEHICLE WHEELS

This invention relates to taper roller bearings for vehicle wheels, primarily non-driven wheels.

According to the invention in one aspect there is provided a tapered roller bearing comprising a bearing cone, a bearing cup encircling the bearing cone, said cone and said cup respectively having radially outer and radially inner faces formed with bearing raceways, tapered rollers mounted radially between the cone and the cup and in rolling engagement with said raceways, said bearing cup having an axial extension portion adapted to operate as a centring support for a vehicle wheel rim.

The outside diameter of said extension portion is such as to allow an easy sliding fit for the wheel rim and for this purpose the extension portion may have a lesser diameter than the main portion of the bearing cup. The free end of the extension portion may have an external chamfer for facilitating location of the wheel rim on the extension portion.

The extended portion will be of a length such as to protrude beyond the hub assembly, when fitted, by an amount sufficient to enable the central aperture in the wheel rim and in certain circumstances in a brake disc or brake drum to which the wheel rim is to be bolted. The extension portion is preferably a little longer than this in practice to give some leeway for small movement of the wheel during fitting and initial tightening of the wheel nuts, to ensure that the wheel is supported during these operations.

In one embodiment, the bearing cone is likewise extended axially, but in the opposite direction, to act as a spacer for spacing the bearing from a second bearing coaxial with the first bearing and used in conjunction with the first bearing in a twin bearing arrangement. This second bearing, being positioned inwardly of the first bearing, may have an extended bearing cone, if desired, to increase the spacing between the raceways of the two bearings.

The invention also provides a tapered roller bearing arrangement for a vehicle wheel, comprising a stub axle, two tapered roller bearings each including a bearing cone, a bearing cup encircling the bearing cone, said cone and said cup respectively having radially outer and radially inner surfaces formed with bearing raceways, tapered rollers mounted radially between and in rolling engagement with said raceways, said bearings having their bearing cones secured on said stub axle with the smaller diameter ends of their respective raceways adjacent each other, the bearing cup of the bearing nearer the free end of the stub shaft having an axial extension portion projecting in a direction away from the other bearing and adapted to operate as a centring spigot for a vehicle wheel rim.

Figure 2:
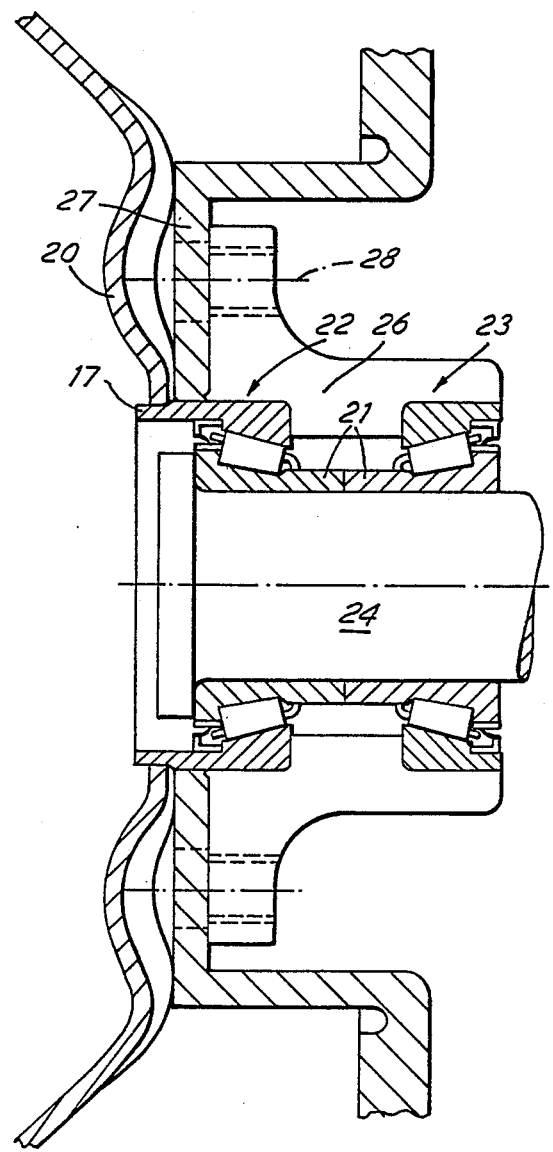

In order that the invention may be better understood, an embodiment thereof will now be described by way of example only, with reference to the accompanying diagrammatic drawings in which:

FIG. 1 is a side sectional view of a tapered roller bearing according to the invention; and FIG. 2 shows the use of the bearing of FIG. 1 in a twin bearing arrangement for the wheel hub of a motor vehicle.

Referring to FIG. 1 of the drawings, the bearing comprises a cylindrical cup 10 having an outer raceway 11 and a cylindrical cone 12 having an inner raceway 13. Mounted between the inner and outer raceways are a plurality of tapered rollers 14 circumferentially spaced apart by a cage 15. An annular seal 16 seals the gap between the cup and the cone to prevent ingress of moisture and dirt from the exterior of the bearing.

Extending axially from that end of the cup 10 having the largest internal diameter is a cylindrical extension portion 17 whose outer end is chamfered at 18. The outer end portion 19 is of reduced diameter suitable to allow location thereon of a wheel rim 20 (see Figure 2). The diameter of the main portion of cup 10 is such as to provide a tight fit in a suitable aperture in the wheel hub; the diameter of portion 19 is such as to allow an easy sliding fit for the wheel rim.

The cone 12 has an axial extension portion 21 extending in the opposite direction to portion 17. Extension portion 21 is intended to space the bearing from an adjacent bearing in multi-bearing arrangement, for example as shown in FIG. 2 to which attention is now directed. FIG. 2 shows a two bearing arrangement for use in a motor vehicle wheel bearing assembly. The assembly comprises two tapered roller bearings 22, 23 mounted in opposite senses on a stub axle 24. The stub axle 24 is provided with an abutment 25 for the left hand (outer) bearing 12. The outer bearing 22 is of the type described above with reference to FIG. 1; the right hand (inner) bearing 23 is of similar construction, but does not possess the extended rim location portion 17. Both bearings have extended cone spacer portions 21, the tips of which abut one another to give the required inter-bearing spacing.

The cups of both bearings are mounted in the wheel hub, shown under reference 26. Attached to the front surface of the wheel hub is a brake member 27. Both the the wheel hub and brake member have a ring of apertures 28 centred on the axis of the stub axle 14 for receiving fixing bolts (not shown). The wheel rim 20 is the outermost element in the illustrated assembly and is readily fitted by locating it on the cylindrical boss formed by the protrusion of the extension portion 17 beyond the brake member 27. The wheel is thus readily located in position and is supported during the fitting and initial tightening of the wheel bolts.

In practice the illustrated bearing will be pregreased so that the wheel manufacturer does not need to carry out this process.

The use of high capacity taper roller bearing of minimum outside diameter, with integrated seal, preadjusted and having an extended cup (outer) member such as described above, offers the following advantages in a non-driven wheel for an automobile or light truck:

simple hub shape
less machining surfaces
more space for brake components
reduced hub outside diameter
permits the use of lower strength, lower cost material for the hub.

I claim:

1. A tapered roller bearing comprising a bearing cone, a bearing cup encircling the bearing cone, said cone and said cup respectively having radially outer and radially inner faces formed with bearing raceways, tapered rollers mounted radially between the cone and the cup and in rolling engagement with said raceways, each roller having a larger diameter end and a smaller diameter end, said bearing cup having at its end adjacent the larger diameter ends of the rollers means defining an axial extension portion projecting axially beyond the cone and adapted to provide an axial sliding fit for a vehicle wheel rim, thereby to operate as a centering support for the wheel rim.

2. A tapered roller bearing as claimed in claim 1, wherein said extension portion has a lesser external diameter than the main portion of the bearing cup.

3. A tapered roller bearing as claimed in claim 1 or claim 2, wherein the free end of the extension portion has a chamfered external diameter for facilitating location of the wheel rim on the extension portion.

4. A tapered roller bearing as claimed in claim 1 or 2, wherein the bearing cone has an axial extension portion projecting in the opposite direction to the extension portion of the bearing cup.

5. A tapered roller bearing arrangement for a vehicle wheel, comprising a stub axle, two tapered roller bearings each including a bearing cone, a bearing cup encircling the bearing cone, said cone and said cup respectively having radially outer and radially inner surfaces formed with bearing raceways, tapered rollers mounted radially between and in rolling engagement with said raceways, said bearings having their bearing cones secured on said stub axle with the smaller diameter ends of their respective raceways adjacent each other, the bearing nearer the free end of the stub shaft having its bearing cup provided with an axial extension portion projecting in a direction away from the other bearing and beyond its bearing cone, which extension portion comprises means adapted to operate as a centering support for a vehicle wheel rim.

6. A tapered roller bearing arrangement as claimed in claim 5 wherein the bearing cones of said bearings have axial extension portions projecting into abutment with each other.

7. A mounting for a vehicle road wheel, said mounting comprising: an axle; a hub surrounding the axle; and a bearing interposed between the axle and the hub, the bearing including an inner race located on the axle and having an outwardly presented raceway, an outer race located in the hub and having an inwardly presented raceway that faces the raceway of the inner race, the outer race projecting axially beyond the hub and inner race in the form of an end portion defining means for fitting into a vehicle road wheel so as to locate the wheel radially with respect to the hub, and rolling elements located between the inner and outer races against the raceways thereof for transferring radial loads between the two races.

8. A mounting according to claim 7 wherein the raceways and rolling elements are configured to transfer thrust loads as well as radial loads.

9. A mounting according to claim 7 wherein the end portion of the outer race is located axially beyond the raceway of the outer race.

10. In combination, a vehicle road wheel having an aperture at its center, and a mounting for said wheel, said mounting comprising: an axle; a hub surrounding the axle; and a bearing interposed between the axle and the hub, the bearing including an inner race located on the axle and having an outwardly presented raceway, an outer race located in the hub and having an inwardly presented raceway that faces the raceway of the inner race, the outer race projecting axially beyond the hub in the form of an end portion which conforms in configuration to the aperture in the vehicle road wheel, the end portion being fitted into said aperture in the vehicle road wheel so as to locate the wheel radially with respect to the hub, and rolling elements located between the inner and outer races and against the raceways thereof for transferring radial loads between the two races.

11. The combination according to claim 10 and further comprising a brake member mounted on the and against the wheel.

12. In combination a bearing, said bearing comprising an outer race providing an inwardly facing raceway, an inner race encircled by the outer race and providing an outwardly facing raceway, and bearing elements in rolling engagement with the raceways, the outer race having an end portion projecting axially beyond the inner race, the radially outer surface of which end portion is adapted to provide an axial sliding fit for a vehicle wheel rim thereby to operate as a centering support for the wheel rim during fitting and tightening of nuts for securing the wheel rim; and an axle and a hub surrounding the axle, said bearing having its inner race mounted on the axle and its outer race mounted in the hub, and a vehicle road wheel having a rim provided at its center with an aperture in which said end portion of the outer race is received in a sliding fit.

13. The combination according to claim 12, wherein the bearing elements are tapered roller elements, each having a larger diameter end and a smaller diameter end; and wherein said end portion of the outer race is adjacent the larger diameter ends of the elements.

* * * * *

UNITED STATES PATENT AND TRADEMARK OFFICE
CERTIFICATE OF CORRECTION

PATENT NO. : 4,900,166
DATED : Feb. 13, 1990
INVENTOR(S) : Rene Candiard

It is certified that error appears in the above-identified patent and that said Letters Patent is hereby corrected as shown below:

Column 4, line 27, after "the" insert "hub"

Signed and Sealed this

Nineteenth Day of February, 1991

Attest:

HARRY F. MANBECK, JR.

*Attesting Officer*   *Commissioner of Patents and Trademarks*